US012517541B2

(12) United States Patent
Varisco

(10) Patent No.: US 12,517,541 B2
(45) Date of Patent: Jan. 6, 2026

(54) MOTOR VEHICLE SEAT WITH INTEGRATED CONTROLS

(71) Applicant: FERRARI S.P.A., Modena (IT)

(72) Inventor: Stefano Varisco, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/318,977

(22) Filed: May 17, 2023

(65) Prior Publication Data

US 2023/0384814 A1   Nov. 30, 2023

(30) Foreign Application Priority Data

May 24, 2022   (IT) .................. 102022000010754

(51) Int. Cl.
| | | |
|---|---|---|
| *G05G 1/01* | (2008.04) | |
| *B60K 26/02* | (2006.01) | |
| *B60T 7/06* | (2006.01) | |
| *B60T 7/10* | (2006.01) | |
| *B62D 1/12* | (2006.01) | |
| *B62D 1/22* | (2006.01) | |
| *G05G 1/44* | (2008.04) | |
| *G05G 9/047* | (2006.01) | |

(52) U.S. Cl.
CPC ............... *G05G 1/01* (2013.01); *B60K 26/02* (2013.01); *B60T 7/06* (2013.01); *B60T 7/102* (2013.01); *B62D 1/12* (2013.01); *B62D 1/22* (2013.01); *G05G 1/44* (2013.01); *G05G 9/047* (2013.01); *B60K 2026/027* (2013.01); *G05G 9/04785* (2013.01)

(58) Field of Classification Search
CPC ..... B60K 26/02; B60K 2026/027; B60T 7/06; B60T 7/102; B62D 1/12; B62D 1/22; G05G 1/44; B60N 2/90
USPC ....................................................... 180/315
See application file for complete search history.

(56) References Cited

U.S. PATENT DOCUMENTS

| | | | | |
|---|---|---|---|---|
| 3,365,975 A | * | 1/1968 | Hathaway .......... | G05G 9/04785 |
| | | | | 74/519 |
| 4,020,916 A | * | 5/1977 | Noble ...................... | B60P 3/00 |
| | | | | 180/315 |

(Continued)

FOREIGN PATENT DOCUMENTS

| | | |
|---|---|---|
| DE | 102019218551 A1 | 6/2021 |
| FR | 3094290 A1 | 10/2020 |

(Continued)

OTHER PUBLICATIONS

Italian Search Report for Application No. 102022000010754; Filing Date: May 24, 2022; Date of Mailing—Dec. 2, 2022, 8 pages.

(Continued)

*Primary Examiner* — Valentin Neacsu
(74) *Attorney, Agent, or Firm* — CANTOR COLBURN LLP

(57) ABSTRACT

An motor vehicle seat for a driver of a motor vehicle includes a frame and one or more control devices coupled to the frame in a movable manner relative to the frame and manually manoeuvrable by the driver to emit electrical control signals configured to drive the motor vehicle according to the movement of the control devices with respect to the frame.

18 Claims, 4 Drawing Sheets

(56) References Cited

U.S. PATENT DOCUMENTS

| | | | |
|---|---|---|---|
| 5,234,071 A * | 8/1993 | Kajiwara | B60K 31/18 180/170 |
| 5,598,742 A * | 2/1997 | Kim | G05G 1/30 74/494 |
| 5,695,020 A * | 12/1997 | Nishimura | B60K 31/0008 180/170 |
| 8,746,395 B2 * | 6/2014 | Frazier | G05G 9/04788 180/335 |
| 9,126,621 B1 * | 9/2015 | Kim | B60K 26/02 |
| 2004/0129486 A1 | 7/2004 | Chernoff et al. | |
| 2004/0140145 A1 | 7/2004 | Chernoff et al. | |
| 2006/0137931 A1 * | 6/2006 | Berg | B62D 1/22 180/333 |
| 2016/0185309 A1 * | 6/2016 | Di Censo | B60R 16/005 701/49 |
| 2017/0072989 A1 * | 3/2017 | Moujoud | B62D 7/16 |
| 2017/0334452 A1 | 11/2017 | Abe et al. | |
| 2018/0237013 A1 | 8/2018 | Inuzuka | |
| 2020/0198700 A1 * | 6/2020 | Benck | B66C 9/00 |
| 2021/0039494 A1 * | 2/2021 | Nageshkar | B62D 1/12 |
| 2023/0311732 A1 * | 10/2023 | Tanabe | B60N 2/879 297/217.3 |

FOREIGN PATENT DOCUMENTS

| | | |
|---|---|---|
| WO | 02064391 A1 | 8/2002 |
| WO | 2007034567 A1 | 3/2007 |

OTHER PUBLICATIONS

Extended European Search Report for European Application No. 23174477.2; Date of Mailing: Oct. 11, 2023, 8 pages.

* cited by examiner

MOTOR VEHICLE SEAT WITH INTEGRATED CONTROLS

CROSS-REFERENCE TO RELATED PATENT APPLICATIONS

This patent application claims priority from Italian patent application no. 102022000010754 filed on May 24, 2022, the entire disclosure of which is incorporated herein by reference.

TECHNICAL FIELD

The invention relates to a motor vehicle seat, in particular of the sports type.

PRIOR ART

Usually, a motor vehicle is driven by a human driver seated on a seat through a plurality of controls comprising a steering wheel and a pedal unit including at least one braking pedal and one accelerating pedal.

This type of controls has long been considered as indispensable and in a certain sense taken for granted for common motor vehicles.

However, as is known, prolonged use of the above-mentioned controls, e.g., during long journeys, in particular including motorways, can be uncomfortable or even merely boring.

In fact, the use of the classic controls usually requires the driver to assume a non-relaxed and normally unnatural posture on the seat.

For this reason, some autonomous driving systems have been invented to allow the driver to relax by detaching himself from the controls for at least some sections of the road, e.g., in the case of long straight stretches.

Therefore, in general, the need is felt to provide alternative ways to drive the motor vehicle.

More specifically, the need is felt to increase driving comfort or the driver's driving pleasure.

An object of the invention is to fulfil at least one of the above requirements, preferably in a simple and reliable way.

DESCRIPTION OF THE INVENTION

The object is achieved by a motor vehicle seat as defined in claim 1.

The dependent claims define particular embodiments of the invention.

BRIEF DESCRIPTION OF THE DRAWINGS

In the following, an embodiment of the invention is described for a better understanding thereof by way of non-limiting example and with reference to the accompanying drawings in which.

EMBODIMENTS OF THE INVENTION

Figure 1:
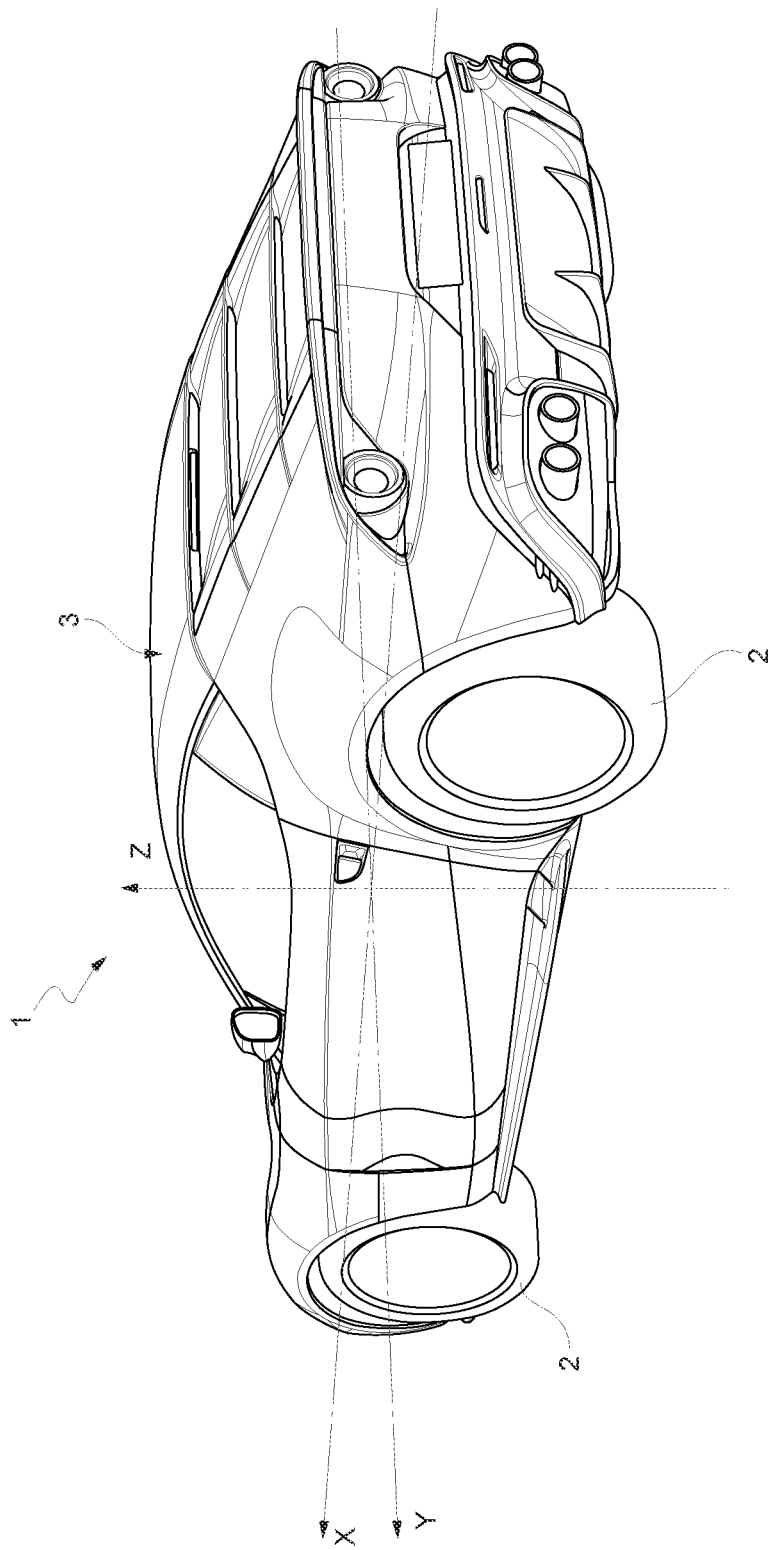
FIG. 1 is a perspective view of a motor vehicle including a seat according to an embodiment of the invention.
Figure 2:
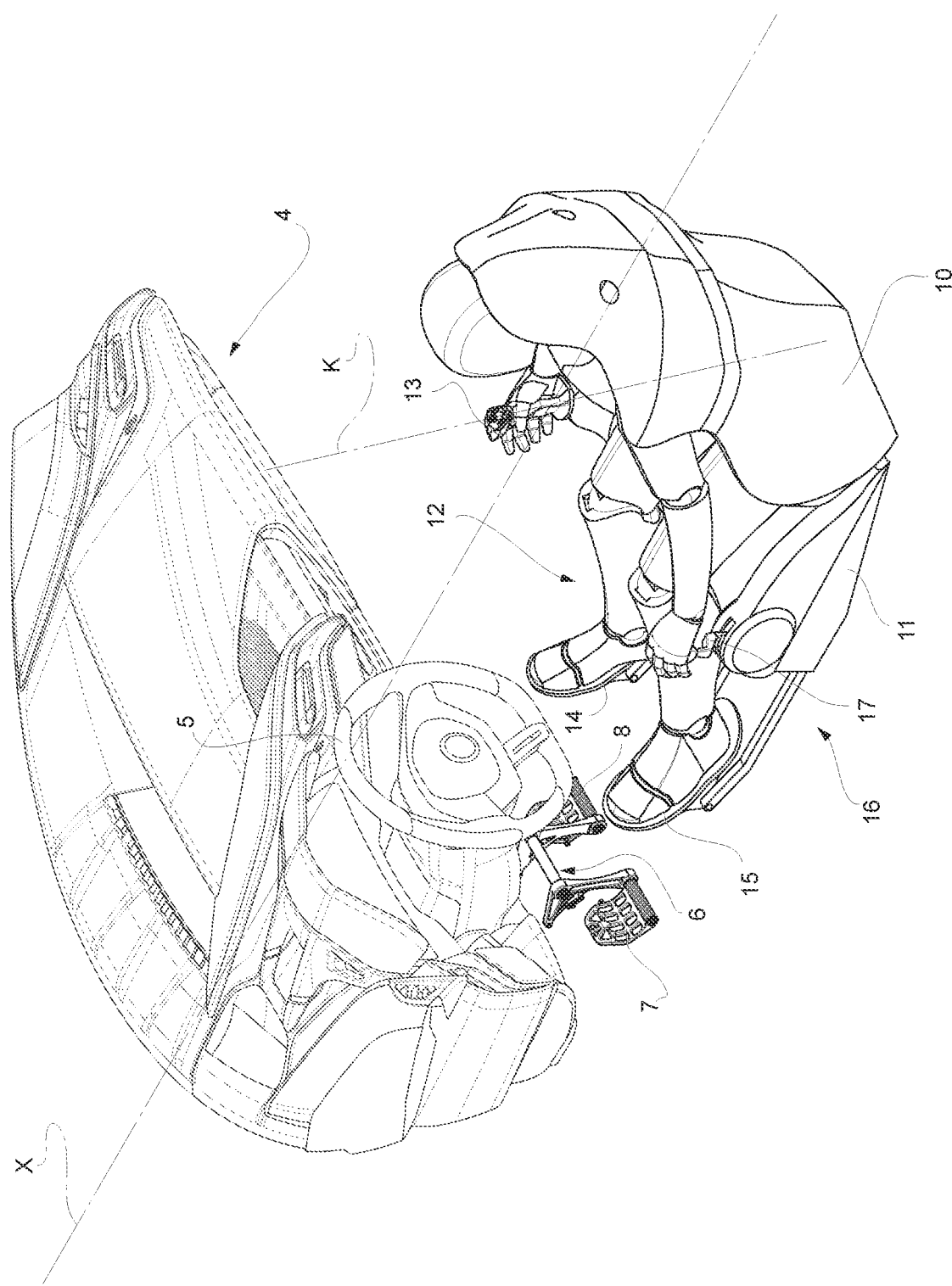
FIG. 2 is a perspective view of a passenger compartment of the motor vehicle in which the seat is visible.
Figure 3:
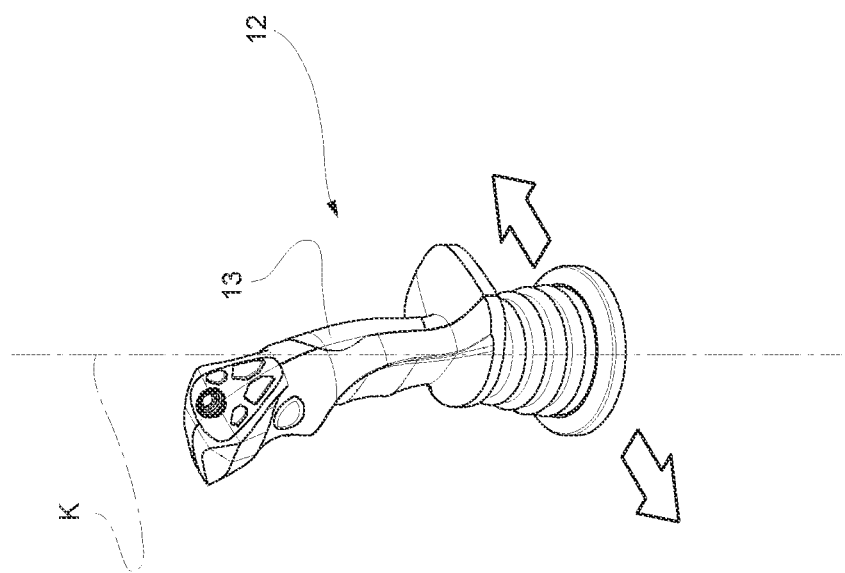
FIG. 3 is a perspective view, on an enlarged scale, of controls for driving the motor vehicle.
Figure 3:
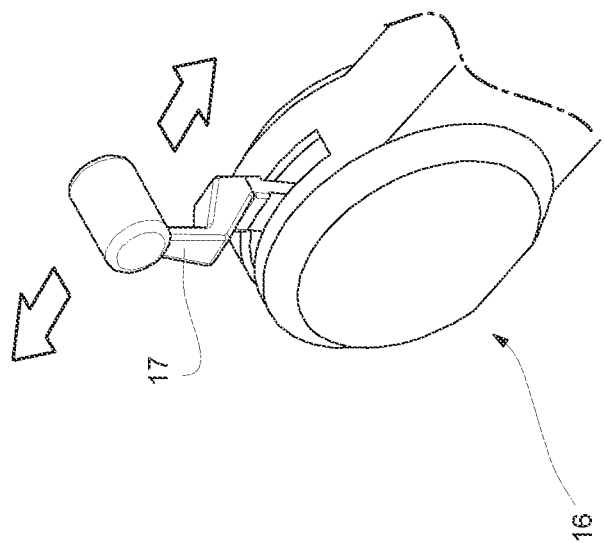
Figure 4:
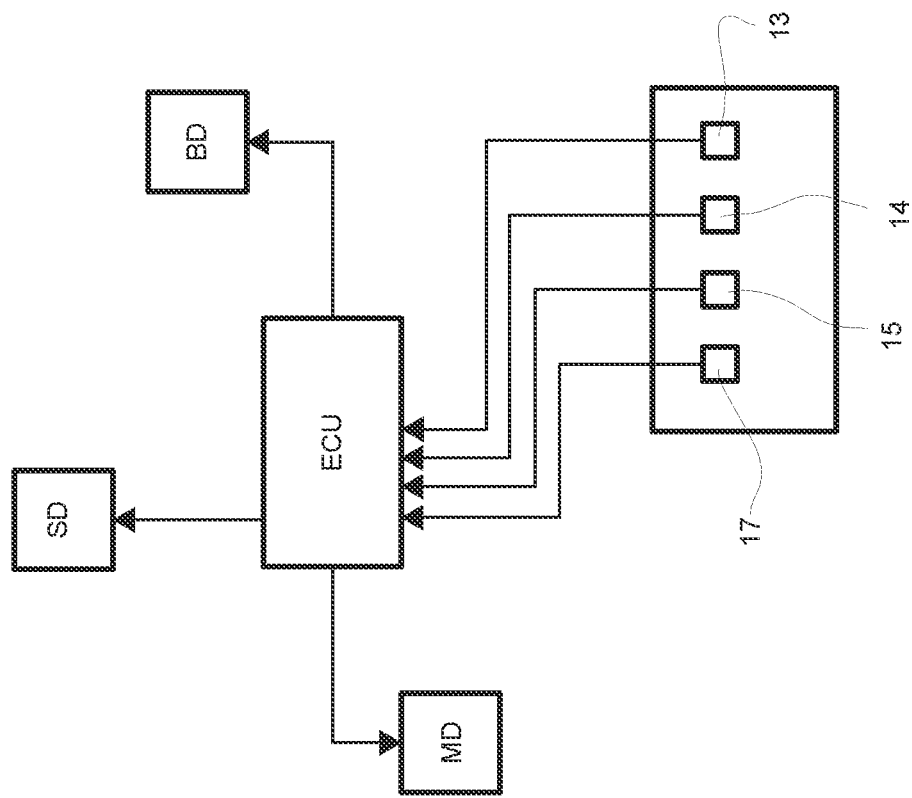
FIG. 4 is a block diagram showing some functional components of the motor vehicle.

In FIG. 1, the reference number 1 is used to indicate, as a whole, a motor vehicle.

As usual, the motor vehicle 1 comprises a plurality of wheels 2 and a body 3 suspended with respect to the wheels by means of a suspension assembly of a known type and not shown.

Furthermore, the motor vehicle 1 comprises a passenger compartment 4 defined by the body 3 and suitable for accommodating at least one driver of the motor vehicle 1.

The motor vehicle 1 comprises a steering device SD of known type for steering at least two of the wheels 2, specifically the front wheels. In this way, the steering device is configured to steer motor vehicle 1. In general, the steering device SD can contain a plurality of known devices adapted for steering the motor vehicle 1; for example, the steering device SD may include a device for exerting forces on the axles of motor vehicle 1 ("torque vectoring") and/or a device for steering the rear wheels.

Inside the passenger compartment 4, the motor vehicle 1 includes a steering wheel 5 for controlling the steering device SD.

The motor vehicle 1 also comprises a propulsion unit MD of a known type and not shown for providing propulsion to at least two of the wheels 2. In other words, the propulsion unit MD is configured to accelerate the motor vehicle 1 along a forward direction, indicated in FIG. 1 by an X axis.

FIG. 1 also shows a vertical Z axis and a Y axis orthogonal to the X, Z axes.

The motor vehicle 1 also comprises a braking unit BD of a known type and not shown. The braking unit BD is configured to brake motor vehicle 1.

Inside the passenger compartment 4, the motor vehicle 1 comprises a pedal unit 6 including at least an accelerator pedal 7 and a brake pedal 8 for respectively controlling the propulsion unit MD and the braking unit BD so as to respectively accelerate and brake the motor vehicle 1.

The motor vehicle 1 also comprises a control unit ECU configured to control each of the steering device SD, the propulsion unit MD, and the braking unit BD on the basis of electrical control signals received and emitted in particular by the steering wheel 5, the accelerator pedal 7 and the brake pedal 8, respectively in response to their actuation by the driver.

Therefore, although this is not necessary, the steering device SD, the propulsion group MD, and the braking group BD respectively together with the steering wheel 5, the accelerator pedal 7, and the brake pedal 8 define with the control unit ECU a so-called drive-by-wire system, i.e., a system in which the steering device SD, the propulsion unit MD, and the braking unit BD are mechanically independent of the steering wheel 5, the accelerator pedal 7 and the brake pedal 8 respectively.

Furthermore, within the passenger compartment 4, the motor vehicle 1 comprises a seat 10, in particular a seat for the driver. Specifically, the seat 10 is arranged in front of the steering wheel 5 and the pedal unit 6 along the X axis.

The seat 10 has a frame 11 coupled to the body 3, preferably in a movable manner so as to have an adjustable position inside the passenger compartment 4.

The seat 10 comprises a plurality of control devices coupled to the frame 11 in a movable manner with respect to the frame 11 and manually manoeuvrable by the driver to emit electrical control signals configured to drive the motor vehicle 1, in particular through the control unit ECU which receives the electrical control signals and consequently commands one or more of the steering device SD, the propulsion unit MD, and the braking unit BD, in response to the electrical control signals received.

Thus, the term drive is understood herein to include at least one or more of the terms steer, accelerate and brake.

Furthermore, as will be derivable or implied from the examples of this description with regard to control devices, the expression manually is understood here in its meaning of non-automatically, i.e., through an active intervention by the driver.

In other words, the expression manually is not to be understood in a limited way as "by means of the hands only", but as "by means of at least one human limb, such as a hand or a foot".

So, for example, the expression manually could be replaced by the expression "by means of a hand or a foot."

The electrical control signals emitted depend on or are a function of the movement of the control devices with respect to the frame 11.

In other words, the electrical control signals are variable according to how the driver operates the control devices.

In greater detail, each of the control devices emits at least one relative electrical control signal, which varies according to how the driver operates the corresponding control device.

In particular, the control devices comprise a first control device 12 configured to emit at least one of the above-mentioned electrical control signals, in particular an electrical control signal for steering the motor vehicle 1.

In other words, the electrical control signals are configured for a function or to perform a function, the function being defined to steer the motor vehicle 1.

Specifically, the control device 12 comprises a control 13, in particular defined by a cloche or a rod.

The control 13 is arranged in particular in such a position that the driver sitting on the seat 10 can reach it and manoeuvre it with one hand, specifically the right hand.

In other words, the control 13 protrudes from an armrest of the seat 10 extending along its own axis K.

The control 13 is movable along or on a transversal plane with respect to the X axis and in particular including the K axis; the control 13 can be movable along or on a plane defined by the Y, Z axes, i.e., a plane orthogonal to the X axis.

More precisely, the control 13 can rotate around an axis parallel to the X axis.

The control 13 can be rotated or is rotatable according to two opposite rotation directions, one of which is a clockwise or rightward rotation direction and the other an anticlockwise or leftward rotation direction, starting from a rest position or one central position.

Alternatively, the control 13 could also only translate according to two opposite directions, e.g., in a non-limiting way, rectilinear.

In general, the control 13 is movable in at least two different and preferably opposite directions, more preferably towards the right and left respectively.

For the sake of clarity, terms such as right and left are referred to in this description with respect to the driver seated on seat 10 in a position suitable for driving motor vehicle 1, i.e., with his gaze directed along the X axis.

According to a first example, the signal emitted by the command 13 can also be configured only to enable the steering of the motor vehicle 1 by means of a command other than the steering wheel 5. In other words, in this case, the motor vehicle 1 could not steer, except by using the steering wheel 5, until the driver operates the command 13 so as to enable the steering.

In other words, the control unit ECU receives the signal emitted by the command 13 and consequently commands the steering device SD so as to enable the steering.

The signal emitted by the command 13 is at least indicative of the direction of movement or more precisely of the rotation of the command 13.

The control unit ECU enables steering in the two possible opposite directions, i.e., steering to the right and to the left, respectively when the signal emitted by the control 13 is indicative of the distinct directions, in particular towards the right and towards the left.

In greater detail, the signal emitted by the control 13 or the control unit ECU enables steering according to a first steering direction, e.g., towards the right, when the control 13 is moved according to one of its possible directions of movement, e.g., the direction of clockwise rotation, while enabling steering according to a second opposite steering direction, e.g., towards the left, when the control 13 is rotated according to the other of its possible directions of movement, e.g., the direction of counter clockwise rotation.

According to a second example, the signal emitted by the control 13 can be configured to set or request a steering angle, i.e., in particular the angle of inclination of the wheels 2 around the Z axis with respect to the X axis.

In other words, the control unit ECU receives the signal emitted by the command 13 and consequently commands the steering device SD so as to set the corresponding steering angle.

The signal emitted by the control 13 is a function of the movement of the control 13 and is indicative of the steering angle to be set. Thus, the control unit ECU sets the steering angle indicated by the signal emitted by the command 13.

Preferably, the steering angle indicated by the signal emitted by the control 13 has a direction or sign dependent on the direction of movement of the control 13, whereby the signal emitted by the control 13 is also indicative of the direction of movement of the control 13. For example, the steering angle indicated when the control 13 is moved according to one of its directions of movement has an opposite direction or sign to that of the steering angle indicated when the control 13 is moved according to the other of its directions of movement.

Specifically, the steering angle can be set proportionally to the rotation angle of the control 13, in particular with respect to its rest position.

Furthermore, the resulting steering direction is preferably consistent with the direction of rotation of the control 13, as particularly in the first example.

Again, with reference to the second example, the signal emitted by the control 13 can also be configured to set a speed of variation of the steering angle, e.g., in a manner proportional to the angular speed of rotation of the control 13.

In other words, the control unit ECU receives the signal emitted by the command 13 and consequently commands the steering device SD so as to set both the corresponding steering angle and its corresponding variation speed.

The signal emitted by the control 13 is therefore indicative of the speed of variation of the steering angle to be set. The control unit ECU sets the rate of change indicated by the signal emitted by command 13.

Clearly, the command 13 could also be a generic command other than the joystick described and illustrated, such as a button, a pedal, a lever, a touchpad, and the like, while maintaining the above-described function of enabling steering or the function of imposing the steering angle and possibly the rate at which the steering angle changes.

Thus, the fact that the control 13 is movable along a plane is clearly optional.

Preferably, the control device 12 comprises at least one or a further command for emitting at least one or a further electrical control signals configured to control the steering of the motor vehicle 1 in a coordinated way with the signal emitted by the command 13, also configured to control the steering of the motor vehicle 1.

As will become clearer from what follows, the further command will preferably also be configured to control the acceleration and deceleration of the motor vehicle 1 in a coordinated way with the signal emitted by another command, in particular distinct from the command 13.

In particular, the control device 12 comprises two controls 14, 15, more particularly in the form of two pedals, i.e., specifically a right and left pedal respectively, which can be pressed from top to bottom with a driver's foot to emit respective electrical control signals, in this case received by the control unit ECU.

Therefore, clearly, the at least one further command is one of the two commands 14, 15 of the command device 12.

The signal emitted by the control 14, i.e., in this case by the right pedal, is configured to increase the steering angle. In other words, the control unit ECU receives the signal emitted by the command 14 and consequently commands the steering device SD so as to increase the steering angle.

The signal emitted by the control 14 is a function of the movement of the control 14 and is indicative of the increase in the steering angle to be set. Therefore, the control unit ECU increases the steering angle corresponding to the increment indicated by the signal emitted by the command 14.

Preferably, the steering angle is increased proportionally to the depressing of the control 14.

The signal emitted by the control 15, i.e., in this case by the left pedal, is configured to decrease the steering angle. In other words, the control unit ECU receives the signal emitted by the command 15 and consequently commands the steering device SD so as to decrease the steering angle.

The signal emitted by the control 15 is a function of the movement of the control 15 and is indicative of the decrease in the steering angle to be set. Thus, the control unit ECU decreases the steering angle corresponding to the decrease indicated by the signal emitted by the command 15.

Preferably, the steering angle is decreased proportionally to the depressing of the control 15.

Clearly, the speed of increase and decrease of the steering angle can be adjusted through the controls 14, 15, in particular proportionally to the depression speed of the same controls 14, 15.

All of this can be valid both according to the first example and according to the second example described above.

In the first example, the actuation of the controls 14, 15 determines the steering angle, as well as possibly its speed of variation, while the actuation of the control 13 determines the mere enabling of the steering. Indeed, in the first example, the increase and decrease of the steering angle start from a zero-steering angle.

Conveniently, the increase and decrease of the steering angle via the commands 14, 15 is permitted or takes place only when the steering is enabled via the command 13, i.e., in other words via the relative electrical control signal. This can mean that the signals emitted by the controls 14, 15 are configured to increase and decrease the steering angle when the steering is enabled via the command 13, i.e. in other words via the relevant electrical control signals, or that the unit control unit ECU is configured to command the steering device SD in a manner corresponding to the signals received from the commands 14, 15 when the control unit ECU enables the steering according to the signal received from the command 13.

In the second example, the actuation of controls 14, 15 respectively determines the increase and decrease of the steering angle set by means of control 13.

Conveniently, the increase and decrease of the steering angle via the controls 14, 15 is permitted or takes place only when the steering angle set via the control 13 is greater in magnitude than a predetermined threshold, e.g., between 10° and 20th. This may mean that the signals emitted by the controls 14, 15 are configured to increase and decrease the steering angle when the steering angle set via the control 13 or indicated by the control 13 is greater in magnitude than the pre-established threshold or that the control unit ECU is configured to command the steering device SD correspondingly to the signals received by commands 14, 15 when the control unit ECU determines that the steering angle indicated by command 13 or set by command 13 is higher in module to the pre-established threshold.

Clearly, the controls 14, 15 could be different from the pedals described above or even be combined in a single control such as a lever or a bidirectional slide, while maintaining the function described above of increasing and decreasing the steering angle as a function of the movement of the command.

Thus, the controls 14, 15 could be combined in a single mobile control to emit a relative electrical control signal configured to increase and/or decrease the steering angle, in particular as a function of the movement of the control.

In practice, the controls 14, 15 are used to regulate more finely the steering of the motor vehicle 1, already more coarsely adjusted or enabled by means of the command 13. In other words, the controls 14, 15 serve for a more dynamic adjustment of the steering or for adding degrees of freedom in steering adjustment.

Furthermore, the seat 10 comprises a control device 16 configured to emit at least one electrical control signal configured to accelerate the motor vehicle 1.

In other words, the electrical control signals are configured for a function or to perform a function, the function being defined to accelerate motor vehicle 1.

More precisely, the control device 16 comprises a control 17, specifically a slide control, configured to emit a first electrical control signal configured to accelerate the motor vehicle 1.

In other words, the first electrical control signals are configured for a function or to perform a function, the function being defined to accelerate motor vehicle 1.

The control 17 is arranged in particular in such a position that the driver sitting on the seat 10 can reach it and manoeuvre it with one hand, specifically the left hand.

Therefore, the controls 13 and 17 are arranged at the opposite sides of the seat 10 according to the Y axis, i.e., respectively to the right and to the left of the driver sitting on the seat 10.

In other words, the control unit ECU receives the signal emitted by the command 17 and consequently commands the propulsion unit MD so as to accelerate the motor vehicle 1.

The signal emitted by the command 17 is a function of the movement of the command 17, as well as in particular of the direction of movement of the command 17. Furthermore, the signal emitted by the command 17 is indicative of the acceleration required for the motor vehicle 1. Thus, the control unit ECU sets the acceleration indicated by the signal emitted by the command 17.

The operating mechanism 17 is coupled to the frame 11 in a sliding manner on a plane or more precisely along a direction belonging to the plane. This is not strictly necessary since the control 17 could also slide along a direction which does not lie on a single plane.

Specifically, the plane in which the drive 17 runs is transversal or more precisely orthogonal to the plane in which the drive 13 rotates. In particular, the plane in which the command 17 runs is defined by the X, Z axes.

The direction along which the command 17 runs has at least one non-zero component along the axis X and can be straight or curvilinear.

Therefore, the sliding of the command 17 can be represented by a rectilinear or curvilinear abscissa; the control 17 has a rest position corresponding to zero acceleration of the motor vehicle 1 and identified for example by a zero straight or curvilinear abscissa.

More generally, since the control 17 could be different from the one described, the sliding direction can be replaced by a generic pre-established movement direction. In other words, the control 17 is generally movable to emit the relative electrical control signal.

Preferably, the acceleration of the motor vehicle 1 or indicated by the signal emitted by the control 17 increases proportionally to the rectilinear or curvilinear abscissa, i.e., proportionally to the moving away of the control 17 from the rest position along the sliding direction of the control 17.

Alternatively, or more preferably additionally, the control device 16 comprises the control 14, which would perform the function of the accelerator pedal 7 in this context by emitting a corresponding electrical control signal configured to accelerate the motor vehicle 1.

Clearly, the control device 16 could comprise another independent control with respect to the control 14, e.g., identical or different to the control 14.

Therefore, implicitly, the control device 16 comprises at least one or a further command for emitting at least one or a further electrical control signals configured to accelerate the motor vehicle 1, in this case in a coordinated way with the signal emitted by the command 17.

The acceleration of the motor vehicle 1 by means of the control 14 takes place in particular only when the steering angle of the motor vehicle 1 is smaller in module than the aforementioned predetermined threshold, i.e., when the motor vehicle 1 is substantially traveling along a straight line.

In other words, the signal emitted by the command 14 is configured to accelerate the motor vehicle 1 when the steering angle, e.g., set through the command 13, is smaller in magnitude than the aforementioned pre-established threshold or when the control unit ECU is configured to command the propulsion unit MD so as to accelerate the motor vehicle 1 corresponding to the signal received by the command 14 when the control unit ECU determines that the steering angle indicated by the command 13 or set by the command 13 is lower in modulus at the pre-set threshold.

Preferably, according to a third example, in particular independently of the other examples, the signal emitted by the command 17 can be configured to set or request a basic acceleration value for the motor vehicle 1.

As already mentioned, the basic acceleration value can be set proportionally to the rectilinear or curvilinear abscissa of command 17.

In other words, the control unit ECU receives the signal emitted by the command 17 and consequently commands the propulsion unit MD so as to set the corresponding acceleration value.

Correspondingly, the signal emitted by command 14 is configured to increase the acceleration value set by command 17. Therefore, the activation of the command 14 determines the increase of the acceleration value set by means of the command 17. In other words, the control unit ECU receives the signal emitted by command 14 and consequently commands the propulsion unit MD so as to increase the acceleration value set by means of command 17.

Preferably, the acceleration value is increased proportionally to the depressing of the command 14.

Alternatively, according to a fourth example, in particular independently from the other examples, the signal emitted by the command 17 could also be configured only to enable acceleration of the motor vehicle (i.e., in other words, to enable a function to accelerate the motor vehicle 1) via command 14, analogously to the first example for command 13. In other words, the control unit ECU is configured to command the propulsion unit MD so as to enable the acceleration of the motor vehicle 1 through the command 14, in response to the reception of the signal emitted by the command 17.

In this case, the control 17 emits the signal when the same control 17 is moved from the rest position according to its sliding direction. In practice, the command 17 behaves in this case as an on-off type command.

Also in this case, the signal emitted by the command 14 is configured to increase the acceleration value of the motor vehicle 1. Here, the acceleration value increase starts from a null value. Therefore, the activation of the command 14 determines the acceleration value, while the activation of the command 17 determines the mere enabling of the acceleration through the command 14.

In other words, the control unit ECU receives the signal emitted by command 14 and consequently commands the propulsion unit MD so as to increase the value of the acceleration enabled by command 17.

The signal emitted by the control 14 is a function of the movement of the control 14 and is indicative of the acceleration to be set. Therefore, the control unit ECU sets the acceleration of the motor vehicle 1 corresponding to the acceleration indicated by the signal emitted by the command 14.

Preferably, the indicated or set acceleration increases proportionally with the depressing of the control 14.

Preferably, the control device 16 or more specifically the control 17 is also configured to emit an electrical control signal configured to brake or decelerate the motor vehicle 1.

In other words, the electrical control signals are configured for a function or to perform a function, the function being defined to brake or decelerate the motor vehicle 1.

Clearly, the seat 10 could also comprise a further control device distinct from the control device 16 and configured to brake or decelerate the motor vehicle 1, exactly as occurs via the control device 16, without any loss of generality.

In greater detail, the control 17 emits the signal to brake the motor vehicle 1 when it runs along a direction opposite to that described above in order to accelerate the motor vehicle 1 starting from the rest position.

Thus, the signal emitted by the command 17 is indicative of the direction of travel of the command 17. The control unit ECU therefore commands the propulsion unit MD and the braking unit BD respectively when the signal received from the command 17 indicates one or the other direction of movement of the command 17.

However, this is not necessary since the control device 16 or another control device could have included a dedicated command to emit the signal configured to brake or decelerate the motor vehicle 1.

The sliding of the control 17 along the aforementioned opposite direction can also in this case be represented by a rectilinear or curvilinear abscissa starting from the rest position corresponding to zero acceleration or deceleration of the motor vehicle 1 and identified for example by an abscissa straight or curvilinear none.

Preferably, the deceleration of the motor vehicle 1 increases proportionally to the rectilinear or curvilinear abscissa, i.e., proportionally to the moving away of the control 17 from the rest position along the aforementioned opposite direction.

More preferably, in the case of a sliding speed higher than a predetermined speed threshold in the aforementioned opposite direction, i.e., in the case of a strong jerk of the control 17, the control 17 is configured to emit a further electrical control signals configured to activate an emergency braking. In other words, the control unit ECU is configured to command the braking group BD so as to activate the emergency braking when it receives the further electrical control signals.

Alternatively, or more preferably additionally, the control device 16 comprises the control 15, which would perform the function of the brake pedal 8 in this context by emitting a corresponding electrical control signal configured to brake the motor vehicle 1.

Clearly, the control device 16 could comprise another independent control with respect to the control 15, e.g., identical to the control 15 or different.

Therefore, implicitly, the control device 16 comprises at least one or a further command for emitting at least one or a further electrical control signals configured to brake or decelerate the motor vehicle 1, in this case in a coordinated way with the signal emitted by the command 17.

The deceleration of the motor vehicle 1 by means of the control 15 takes place in particular only when the steering angle of the motor vehicle is lower than the aforementioned predetermined threshold for the steering angle, i.e., when the motor vehicle 1 is substantially traveling along a straight line.

In other words, the signal emitted by the command 15 is configured to decelerate the motor vehicle 1 when the steering angle, e.g., set by means of the command 13, is smaller in magnitude than the aforementioned pre-established threshold or when the control unit ECU is configured to control the braking unit BD so as to decelerate the motor vehicle 1 corresponding to the signal received by the command 15 when the control unit ECU determines that the steering angle indicated by the command 13 or set by means of the command 13 is lower in modulus at the pre-set threshold.

Preferably, according to a fifth example, in particular independently of the other examples, the signal emitted by the command 17 can be configured to set or request a basic deceleration value for the motor vehicle 1.

As already mentioned, the basic deceleration value can be set proportionally to the rectilinear or curvilinear abscissa of the control 17 according to the aforementioned opposite direction.

In other words, the control unit ECU receives the signal emitted by the command 17 and consequently commands the braking unit BD so as to set the corresponding deceleration value.

Correspondingly, the signal output by command 15 is configured to increase the deceleration value set by command 17. Therefore, the activation of command 15 determines the increase of the deceleration value set by means of command 17. In other words, the control unit ECU receives the signal emitted by command 15 and consequently commands the braking unit BD so as to increase the deceleration value set by means of command 17.

Preferably, the deceleration value is increased proportionally to the depressing of the command 15.

Alternatively, according to a sixth example, in particular independently from the other examples, the signal emitted by the command 17 could also be configured only to enable the deceleration of the motor vehicle (i.e., in other words, a function of decelerating the motor vehicle 1) via command 15, analogously to the first example for command 13. In other words, the control unit ECU is configured to control the braking unit BD so as to enable the deceleration of the motor vehicle 1 through the command 15 in response to the reception of the signal emitted by the command 17.

In this case, the control 17 emits the signal when the same control 17 is moved from the rest position according to said opposite sliding direction. In practice, the command 17 behaves in this case as an on-off type command.

Also in this case, the signal emitted by the command 15 is configured to increase the deceleration value of motor vehicle 1. Here, the increase of the deceleration value starts from a null value. Therefore, the activation of the command 15 determines the deceleration value, while the activation of the command 17 determines the mere enabling of the deceleration through the command 15.

In other words, the control unit ECU receives the signal emitted by command 15 and consequently commands the braking unit BD so as to increase the value of the deceleration enabled by command 17.

The signal emitted by the control 15 is a function of the movement of the control 15 and is indicative of the deceleration to be set. Therefore, the control unit ECU sets the deceleration of the motor vehicle 1 corresponding to the deceleration indicated by the signal emitted by the command 15.

Preferably, the indicated or set deceleration increases proportionally with the depressing of the control 15.

Clearly, the operation of the controls 14, 15 can be combined with the operation of the control 17 for each of the sliding directions or more generally for each of the movement directions.

In other words, the signal emitted by command 15 is configured to decrease the acceleration value set by command 17.

Similarly, the signal emitted by command 14 is configured to decrease the deceleration value set by command 17.

Therefore, the control unit ECU can receive the signal emitted by the command 14 and consequently command the propulsion unit MD respectively so as to increase the acceleration value or decrease the deceleration value set through the command 17 on the basis of how the command 17 was actuated or more precisely according to the sliding direction followed by the command 17.

Similarly, the control unit ECU can receive the signal emitted by the command 15 and consequently command the braking unit BD respectively so as to increase the deceleration value or decrease the acceleration value set by the command 17 according to how the command 17 was actuated or more precisely according to the sliding direction followed by the command 17.

If the control 17 has been moved according to the direction to accelerate the motor vehicle 1, the control unit ECU determines this from the signal emitted by the control 17, which is indicative of the sliding direction of the control 17; then, the control unit ECU which receives the signal emitted by the command 15 sets the decrease in acceleration indicated by this latter received signal.

If the control 17 has been moved according to the direction to decelerate the motor vehicle 1, the control unit ECU determines this from the signal emitted by the control 17, which is indicative of the sliding direction of the control 17; then, the control unit ECU which receives the signal emitted by the command 14 sets the increase in acceleration indicated by this latter received signal.

Clearly, as already mentioned, the controls 14, 15 could be different from the pedals described above or even be combined in a single control such as a lever or a bidirectional slide, while maintaining the function described above of increasing and decreasing acceleration or deceleration of the motor vehicle 1.

In practice, the controls 14, 15 are used to adjust the advancement and braking of the motor vehicle 1 more finely, already more coarsely adjusted or enabled through the control 17. In other words, the controls 14, 15 serve for a more dynamic regulation of the forward movement and braking of the motor vehicle 1 or for adding degrees of freedom of regulation.

Based on what has been described above, the control devices 12, 16 or the seat 10 and the control unit ECU form part of a control assembly for driving the motor vehicle.

In particular, the control unit ECU executes a method for controlling the motor vehicle 1.

From the above, the advantages of the seat 10 according to the invention are evident.

The driver can easily drive the motor vehicle 1 by steering, accelerating, and braking in a natural position on the seat 10 since the control devices 12, 16 are located in correspondence with his hands and feet.

In fact, the driver no longer necessarily needs to extend his feet to reach the accelerator pedal 7 and the brake pedal 8 or his arms to reach the steering wheel 5 but can assume a comfortable and relaxed position on the seat 10 while still being able to drive the motor vehicle 1.

Furthermore, the controls 13, 14, 15 and 17 allow complete regulation of the steering, braking and forward movement of the motor vehicle 1, even with more degrees of freedom than the control of the motor vehicle 1 via the steering wheel 5, the accelerator pedal 7 and the brake pedal 8.

In fact, commands 14, 15 overlap commands 13, 17; in this way, the controls 13, 17 and the controls 14, 15 can respectively be used for a coarser and finer adjustment of the steering, braking and forward movement of the motor vehicle 1.

Finally, it is clear that modifications and variations may be made to the seat 4 according to the invention which however do not depart from the scope of protection defined by the claims.

In particular, each of the controls 13, 14, 15, 17 can be replaced by another type of control, including a lever, a touchpad, a rod, a knob, a button, and the like.

Furthermore, each of the controls 13, 14, 15, 17 can be coupled more generally to a frame of the motor vehicle 1, e.g., a door frame or to the central tunnel, provided that it is arranged in the area pertaining to the seat 10, i.e., such that the driver can reach and manoeuvre them from a seated position on seat 10.

In other words, the seat 10 should not necessarily be understood as a simple seat, but possibly as a generalized seat so as to also include parts of the frame of the motor vehicle 1. For example, the frame 11 could even be a portion of the frame of the motor vehicle 1. For example, the frame 11 could be fixed with respect to the frame of the motor vehicle 1.

More specifically, the functions of the command 13 can also be attributed to the command 17, just as the functions of the command 17 can be attributed to the command 13.

Furthermore, all the examples described can be combined with each other to form other examples forming part of this description.

In this description, the terms brake and decelerate are interchangeable.

In addition, further examples supported by what has been described above and which can be completely combined or integrated with what has been described above are listed below in the form of numbered clauses ordered according to their numbering.

Clause 1: a motor vehicle seat 10 for a driver of a motor vehicle 1, the seat (10) comprising a frame (11) and one or more control devices (12, 13, 14, 15, 16, 17) coupled to the frame (11) in a movable manner relative to the frame (11) and manually manoeuvrable by the driver to emit electrical control signals configured to drive the motor vehicle (1) as a function of the movement of the control devices (12, 13, 14, 15, 16, 17) relative to the frame (11).

Clause 2: the seat according to clause 1, wherein one or more control devices 12, 13, 14, 15, 16, 17 comprise a first control device 12 configured to emit at least a first electrical control signals of said electrical control signals, the first electrical control signal being configured to steer the motor vehicle 1.

Clause 3: the seat according to clause 2, wherein the first control device 12 comprises a joystick 13 movable at least along a first plane to emit the first electrical signal, wherein the first electrical signal is configured to at least enable a steering of the motor vehicle 1 or to set a steering angle.

Clause 4: the seat according to clause 3, wherein the first control device 12 further comprises a first and a second pedal 14, 15 depressible from top to bottom with a foot of the driver to emit a second and a third control signal of said electrical control signals, respectively, the second and third electrical control signals being respectively configured to increase and decrease the steering angle.

Clause 5: the seat according to any one of the preceding claims, wherein the one or more control devices 12, 13, 14, 15, 16, 17 comprise a second control device 16 configured to emit at least one fourth electrical control signal of said electrical control signals, the fourth electrical control signal being configured to accelerate the motor vehicle 1.

Clause 6: the seat according to clause 5, wherein the second control device 16 comprises a third pedal 14 depressible from the top to the bottom with a foot of the driver, and/or a first slide control 17 sliding along a second plane to emit the fourth electrical control signal.

Clause 7: the seat according to any one of the preceding clauses, wherein said one or more control devices 12, 13, 14, 15, 16, 17 comprise a third control device 16 configured to emit at least one fifth electrical control signal of said electrical control signals, the fifth electrical control signal being configured to brake the motor vehicle.

Clause 8: the seat according to clause 7, wherein the third control device 16 comprises a fourth pedal 15 depressible from top to bottom with a foot of the driver and/or a second slide control 17 sliding along a second plane to emit the fifth electrical control signals.

Clause 9: control assembly for a motor vehicle 1 comprising a seat 10 according to any of the preceding clauses and a control unit ECU configured to receive the electrical control signals and to control the motor vehicle 1 according to the electrical control signals received.

Clause 10: motor vehicle 1 including the control assembly according to clause 9.

The invention claimed is:

1. A motor vehicle seat for a driver of a motor vehicle, the seat comprising a frame and one or more control devices coupled to the frame in a movable manner relative to the frame and manually manoeuvrable by the driver to emit electrical control signals configured to drive the motor vehicle based on a movement of the one or more control devices relative to the frame,
wherein the one or more control devices comprise a first control device configured to emit at least a first electrical control signal of said electrical control signals, the first electrical control signals being configured for a function defined by one of steering the motor vehicle, accelerating the motor vehicle, and decelerating the motor vehicle,
wherein the first control device is movable to emit the first electrical signal, and
wherein the first electrical signal is configured to at least enable a steering of the motor vehicle or to set a steering angle, the first control device further comprising a first and a second pedal depressible from a top to a bottom with a foot of the driver to emit, respectively, second and third electrical control signals of said electrical control signals, the second and third electrical control signals respectively being configured to increase and decrease the steering angle.

2. The seat according to claim 1, wherein the first control is defined by a joystick movable at least along a plane to emit the first electrical signal.

3. The seat according to claim 1, wherein one of said one or more control devices is configured to emit at least one additional electrical control signal of said electrical control signals, the at least one additional electrical control signal being configured to brake the motor vehicle.

4. The seat according to claim 3, wherein the one or more control devices comprises an additional pedal depressible from the top to bottom with the foot of the driver and/or a slide control sliding along a plane to emit the at least one additional electrical control signals.

5. The seat according to claim 1, wherein said one or more control devices comprise a second control device configured to emit at least one additional electrical control signal of said electrical control signals, the at least one additional electrical control signal being configured to accelerate the motor vehicle.

6. The seat according to claim 5, wherein the second control device comprises a third pedal depressible from the top to the bottom with a foot of the driver, and/or a slide control sliding along a plane to emit the at least one additional electrical control signal.

7. A control assembly for a motor vehicle, the control assembly comprising a seat according to claim 1 and a control unit (ECU) configured to receive the electrical control signals and to drive the motor vehicle according to the electrical control signals received.

8. A motor vehicle comprising the control assembly according to claim 7.

9. A motor vehicle seat for a driver of a motor vehicle, the seat comprising a frame and one or more control devices coupled to the frame in a movable manner relative to the frame and manually manoeuvrable by the driver to emit electrical control signals configured to drive the motor vehicle based on the movement of the control devices relative to the frame,
wherein the one or more control devices comprise a first control device configured to emit at least a first electrical control signal of said electrical control signals, the first electrical control signals being configured for a function defined by one of steering the motor vehicle, accelerating the motor vehicle, and decelerating the motor vehicle,
wherein the first control device is movable for emitting the first electrical control signal, and
wherein the first electrical control signal is configured to enable said function, and at least one second control device is movable from a rest position to emit at least one second electrical control signal of said electrical control signals, the second electrical control signal being configured to proportionally increase or decrease a steering angle or an acceleration value of the motor vehicle or a deceleration value of the motor vehicle, respectively, as a function of an amount of movement of the second control device from the rest position only when said function is first enabled through movement of the first control device.

10. The motor vehicle according to claim 9, wherein the first electrical control signal is configured for only the steering function such that the second electrical control signal is configured to increase or decrease only the steering angle when said function is enabled through movement of the first control device.

11. The motor vehicle according to claim 9, wherein the first control device is defined by a joystick movable at least along a first plane to emit the first electrical control signal.

12. The motor vehicle according to claim 9, wherein the second control device comprises a pedal depressible from the top to the bottom with the foot of the driver, and/or a slide control sliding along a plane to emit the second electrical control signal, the second electrical control signal being configured to increase the steering angle or the acceleration value of the motor vehicle or the deceleration value of the motor vehicle.

13. The motor vehicle according to claim 9, wherein the second control device comprises a pedal depressible from the top to bottom with a foot of the driver and/or a slide control sliding along a plane to emit the second electrical control signal, the second electrical control signal being configured to decrease the steering angle or the acceleration value of the motor vehicle or the deceleration value of the motor vehicle, respectively.

14. A motor vehicle seat for a driver of a motor vehicle, the seat comprising a frame and one or more control devices coupled to the frame in a movable manner relative to the frame and manually manoeuvrable by the driver to emit electrical control signals configured to drive the motor vehicle based on the movement of the control devices relative to the frame, wherein the one or more control devices comprise a first control device configured to emit at least a first electrical control signal of said electrical control signals, the first electrical control signals being configured for a function defined by one of steering the motor vehicle, accelerating the motor vehicle, and decelerating the motor vehicle, and wherein the first control device is movable for emitting the first electrical control signal, wherein the first electrical control signal is configured to set a steering angle or an acceleration value of the motor vehicle or a deceleration value of the motor vehicle, respectively, and at least one second control device movable from a rest position to emit at least one second electrical control signal of said electrical control signals, the second electrical control signal being configured to proportionally increase or decrease the steering angle, or increase or decrease the acceleration value of the motor vehicle, or increase or decrease the deceleration value of the motor vehicle as a function of an amount of movement of the second control device from the rest position only if first set via movement of the first control device.

15. The motor vehicle of claim 14, wherein the first control device is configured for only the steering function such that the first electrical control signal is configured only to set the steering angle and the at least one second control device is configured to increase or decrease the steering angle in response to the second electrical control signal.

16. The motor vehicle according to claim 14, wherein the first control device is defined by a joystick movable at least along a plane to emit the first electrical control signal.

17. The motor vehicle according to claim 14, wherein the second control device comprises a pedal depressible from the top to the bottom with a foot of the driver, and/or a slide control sliding along a plane to emit the second electrical control signal, the second electrical control signal being configured to increase the steering angle or the acceleration value of the motor vehicle or the deceleration value of the motor vehicle.

18. The motor vehicle according to claim 14, wherein the second control device comprises a pedal depressible from the top to bottom with a foot of the driver and/or a slide control sliding along a plane to emit the second electrical control signal, the second electrical control signal being configured to decrease the steering angle or the acceleration value of the motor vehicle or the deceleration value of the motor vehicle.

* * * * *